(12) United States Patent
Wang

(10) Patent No.: US 12,011,659 B2
(45) Date of Patent: Jun. 18, 2024

(54) ACCOUNT CONNECTING METHOD AND APPARATUS, STORAGE MEDIUM, AND ELECTRONIC DEVICE

(71) Applicant: TENCENT TECHNOLOGY (SHENZHEN) COMPANY LIMITED, Shenzhen (CN)

(72) Inventor: Yachang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 226 days.

(21) Appl. No.: 17/735,668

(22) Filed: May 3, 2022

(65) Prior Publication Data
US 2022/0258041 A1    Aug. 18, 2022

Related U.S. Application Data

(63) Continuation of application No. PCT/CN2021/090458, filed on Apr. 28, 2021.

(30) Foreign Application Priority Data

May 22, 2020    (CN) .......................... 202010443207.1

(51) Int. Cl.
  *A63F 13/352*   (2014.01)
  *A63F 13/34*    (2014.01)
  (Continued)

(52) U.S. Cl.
  CPC ............ *A63F 13/352* (2014.09); *A63F 13/34* (2014.09); *A63F 13/358* (2014.09); *H04L 67/131* (2022.05)

(58) Field of Classification Search
  None
  See application file for complete search history.

(56) References Cited

U.S. PATENT DOCUMENTS 9,508,225 B2    11/2016   Katz et al.
2002/0091833 A1    7/2002   Grimm et al.
(Continued)

FOREIGN PATENT DOCUMENTS

CN    103475743 A    12/2013
CN    104717289 A    6/2015
(Continued)

OTHER PUBLICATIONS

China National Intellectual Property Administration (CNIPA) Office Action 1 for 202010443207.1 dated Dec. 11, 2020 8 Pages (including translation).
(Continued)

*Primary Examiner* — Jason T Yen
(74) *Attorney, Agent, or Firm* — ANOVA LAW GROUP, PLLC

(57) ABSTRACT

An account connecting method includes: acquiring, by a first connecting device, a first data request transmitted by a first account, transmitting the first data request to a first server of first type, acquiring, on the target connecting device, an address of a second server transmitted by the first server after an interaction scene for realizing a scene interaction is created on the second server, transmitting the address of the second server to the first account, forwarding, to the second server, interaction data in the scene interaction transmitted by the first account, and forwarding, between a target application and an associated server by using a connecting device having a lowest network delay with an account with which the connecting device is required to interact, the interaction data required to be exchanged.

20 Claims, 9 Drawing Sheets

(51) Int. Cl.
    *A63F 13/358*    (2014.01)
    *H04L 67/131*    (2022.01)

(56) References Cited

U.S. PATENT DOCUMENTS

| | | | |
|---|---|---|---|
| 2008/0220873 A1* | 9/2008 | Lee | A63F 13/352 |
| | | | 463/42 |
| 2009/0275414 A1* | 11/2009 | Lee | G06N 3/004 |
| | | | 463/42 |
| 2012/0314651 A1 | 12/2012 | Takamura et al. | |
| 2013/0073689 A1 | 3/2013 | Kolam et al. | |
| 2013/0151688 A1 | 6/2013 | Widjaja et al. | |
| 2015/0106497 A1 | 4/2015 | Kaneko et al. | |
| 2015/0209670 A1* | 7/2015 | Furumoto | A63F 13/358 |
| | | | 463/24 |
| 2015/0283456 A1 | 10/2015 | Chan et al. | |
| 2016/0119155 A1 | 4/2016 | Marlow | |
| 2017/0050111 A1* | 2/2017 | Perry | H04L 67/131 |
| 2017/0249802 A1 | 8/2017 | Paradise et al. | |
| 2017/0364697 A1 | 12/2017 | Zhao et al. | |

FOREIGN PATENT DOCUMENTS

| | | |
|---|---|---|
| CN | 104978383 A | 10/2015 |
| CN | 107659559 A | 2/2018 |
| CN | 108777683 A | 11/2018 |
| CN | 109327542 A | 2/2019 |
| CN | 109379617 A | 2/2019 |
| CN | 109513206 A | 3/2019 |
| CN | 110812835 A | 2/2020 |
| CN | 110855704 A | 2/2020 |
| CN | 110402570 B | 8/2020 |
| CN | 111617487 A | 9/2020 |
| EP | 3397363 B1 | 2/2020 |
| JP | 2000508097 A | 6/2000 |
| JP | 2012257077 A1 | 12/2012 |
| JP | 2014008349 A | 1/2014 |
| JP | 2015501991 A | 1/2015 |
| WO | 2019195167 A2 | 10/2019 |

OTHER PUBLICATIONS

The World Intellectual Property Organization (WIPO) International Search Report for PCT/CN2021/090458 dated Jul. 27, 2021 5 Pages (including translation).
Indian Patent Office Examination report for Application No. 202237024524 dated Jan. 25, 2023 6 pages.
Experiences from the Development of the Pervasive Game City Zombie Meng Zhu, Alf Inge Wang and Øyvind Rolland Norwegian University of Science and Technology(NTNU) Sem Sælandsvei 7-9,NO-7491, Trondheim, Norway.
The European Patent Office (EPO) The Extended European Search Report for 21809337.5 dated Mar. 22, 2023 13 Pages (including translation).
Yerxa G: "Web Server Balancing:an Act Worth Watching",Network Computing,Manhasset, NY, US ,Jul. 1, 1997 (Jul. 1, 1997) , p. 1/02 ,XP002910308.
The Japan Patent Office (JPO) Notification of Reasons for Refusal for Application No. 2022-538828 and Translation dated Jun. 13, 2023 6 Pages.

* cited by examiner

ACCOUNT CONNECTING METHOD AND APPARATUS, STORAGE MEDIUM, AND ELECTRONIC DEVICE

CROSS-REFERENCES TO RELATED APPLICATIONS

This application is a continuation application of PCT Patent Application No. PCT/CN2021/090458, entitled "ACCOUNT ACCESS METHOD AND APPARATUS, STORAGE MEDIUM, AND ELECTRONIC DEVICE" and filed on Apr. 28, 2021, which claims priority to Chinese Patent Application No. 202010443207.1, filed with the China National Intellectual Property Administration on May 22, 2020 and entitled "ACCOUNT CONNECTING METHOD AND APPARATUS, STORAGE MEDIUM, AND ELECTRONIC DEVICE IN GAME APPLICATION", the entire contents of both of which are incorporated herein by reference.

FIELD OF THE TECHNOLOGY

The present disclosure relates to the field of computers, and in particular, to an account connecting method and apparatus, a storage medium, and an electronic device.

BACKGROUND OF THE DISCLOSURE

The cloud technology is a collective name of a network technology, an information technology, an integration technology, a management platform technology, an application technology, and the like based on an application of a cloud computing business mode, and may form a resource pool, which is used as required, and is flexible and convenient. A cloud computing technology will become an important support. Background services of a technology network system require a lot of computing and storage resources, such as a video website, a picture website, and more portal websites. With the rapid development and application of the Internet industry, each item may have its own identification mark in the future, and the identification marks are required to be transmitted to a background system for logical processing. Data of different levels will be processed separately, and all kinds of industry data require a strong system support, which can only be achieved by means of the cloud computing.

In a current scene interaction application service, a central Internet data center (IDC) is generally selected as a public server cluster, which includes all other servers except a player versus player (PvP) server, such as a match server and a data storage server. The PvP server is deployed in each of the other IDCs for new single-round access by a user, and a round-trip time (RTT) of the user to each pre-established PvP server is displayed on a main interface. The user manually selects, according to his or her own situation for matching, the server he or she wants to enter, and performs the matching in the public server cluster. After the matching succeeds, the user enters the PVP server of the selected IDC for a single scene interaction.

However, in the related art, the user can only manually select, according to his or her own situation for the single scene interaction, a server in a region he or she wants to enter. In this way, only the user accounts in the same region can be selected for access for the single scene interaction, and the accounts from a plurality of different geographic regions are not allowed for access for the same scene interaction. For example, a game scenario is used as an example. The accounts from the plurality of different geographic regions are not allowed to enter a same game for game interaction. Therefore, the conventional method is excessively limited.

SUMMARY

According to various embodiments provided in the present disclosure, an account connecting method and apparatus, a storage medium, and an electronic device are provided.

According to one aspect of the embodiments of the present disclosure, an account connecting method is provided, including: acquiring, by a first connecting device, a first data request transmitted by a first account, the first data request being a request to start a scene interaction in a target application; transmitting, by the first connecting device, the first data request to a first server, the first server being configured to determine a first group of accounts as accounts about to participate in the scene interaction, and determine an address of a second server, the second server being configured to create an interaction scene, the first group of accounts comprising accounts from a first group of different geographic regions, the first group of accounts comprising the first account, the accounts in the first group respectively transmitting a data request to the first server by using a corresponding connecting device, the data request a request to start the scene interaction, and at least two of the connecting devices corresponding to the accounts in the first group are from a second group of different geographic regions; acquiring, by a target connecting device, the address of the second server transmitted by the first server after the interaction scene is created by the second server, network delays between the second server and the corresponding connecting devices being all less than a first delay threshold, and the target connecting device being a connecting device having a lowest network delay with the first account; and transmitting, by the target connecting device, the address of the second server to the first account, and forwarding, to the second server, interaction data in the scene interaction transmitted by the first account.

According to another aspect of the embodiments of the present disclosure, an account connecting system including a first connecting device and a target connecting device. The first connecting device is configured to acquire a first data request transmitted by a first account, the first data request being a request to start a scene interaction in a target application; and transmit the first data request to a first server, the first server being configured to determine a first group of accounts as accounts about to participate in the scene interaction, and determine an address of a second server of second type, the second server being configured to create the scene interaction, the first group of accounts comprising accounts from a first group of different geographic regions, the first group of accounts comprising the first account, and at least two of the connecting devices corresponding to the first group of accounts are from a second group of different geographic regions. The target connecting device is configured to acquire the address of the second server transmitted by the first server after the scene interaction is created on the second server, network delays between the second server and the corresponding connecting devices being all less than a first delay threshold, and the target connecting device being a connecting device having a lowest network delay with the first account; and transmit the address of the second server to the first account, and forward, to the second server, interaction data in the scene interaction transmitted by the first account.

an

According to still another aspect of the embodiments of the present disclosure, one or more non-transitory computer-readable storage media are further provided. The computer-readable storage medium stores computer-readable instructions, the computer-readable instructions, when being run, performing the account connecting method.

According to still another aspect of the embodiments of the present disclosure, an electronic device is further provided, including a memory and one or more processors, the memory storing computer-readable instructions, and the one or more processors being configured to: acquire a first data request transmitted by a first account, the first data request being a request to start a scene interaction in a target application; transmit the first data request to a first server, the first server being configured to determine a first group of accounts as accounts about to participate in the scene interaction, and determine an address of a second server of second type, the second server being configured to create the scene interaction, the first group of accounts comprising accounts from a first group of different geographic regions, the first group of accounts comprising the first account, and at least two of the connecting devices corresponding to the first group of accounts are from a second group of different geographic regions; acquire the address of the second server transmitted by the first server after the scene interaction is created on the second server, network delays between the second server and the corresponding connecting devices being all less than a first delay threshold, and the device being a connecting device having a lowest network delay with the first account; and transmit the address of the second server to the first account, and forward, to the second server, interaction data in the scene interaction transmitted by the first account.

Details of one or more embodiments of the present disclosure are provided in the accompanying drawings and descriptions below. Based on the specification, the accompanying drawings, and the claims of the present disclosure, other features, objectives, and advantages of the present disclosure become clearer.

BRIEF DESCRIPTION OF THE DRAWINGS

The accompanying drawings described herein are used for providing a further understanding of the present disclosure, and form part of the present disclosure. Exemplary embodiments of the present disclosure and descriptions thereof are used for explaining the present disclosure, and do not constitute any inappropriate limitation to the present disclosure. In the accompanying drawings.

DESCRIPTION OF EMBODIMENTS

Figure 1:
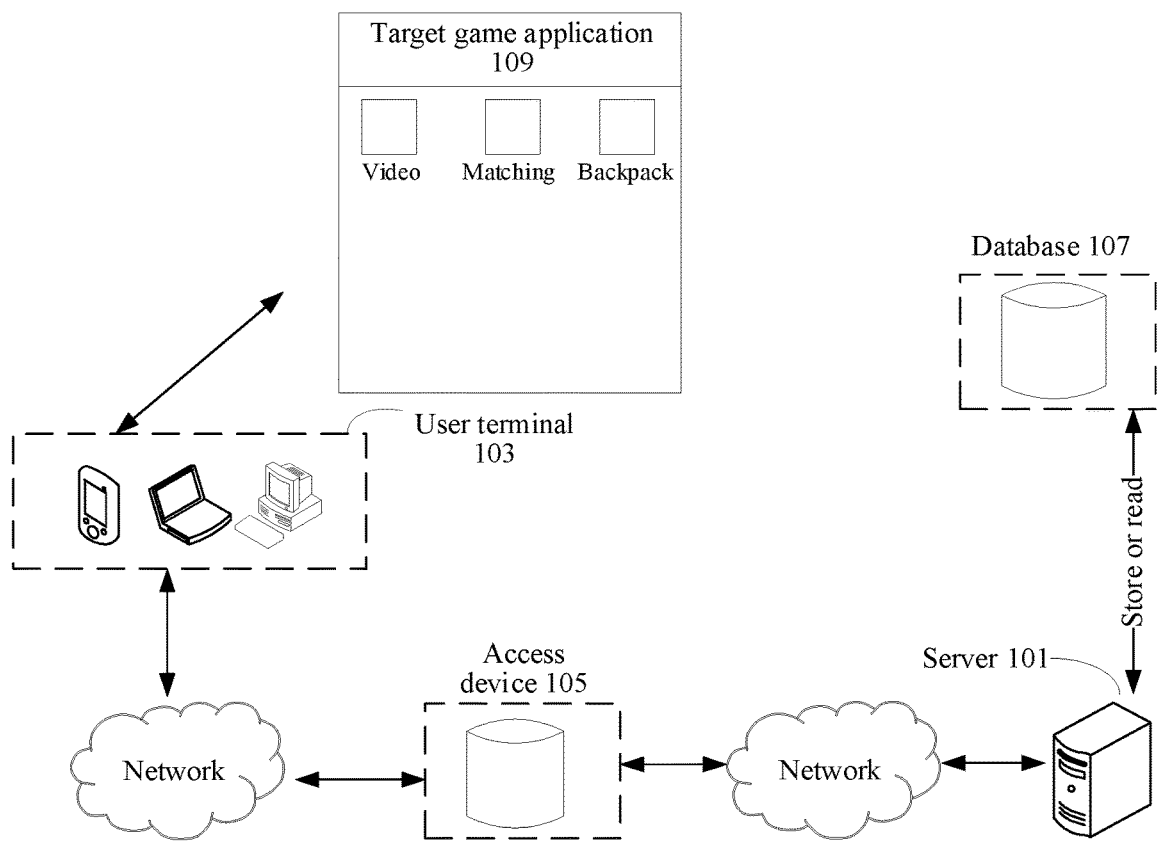
FIG. 1 is a schematic diagram of an application environment of an account connecting method according to an embodiment.

To make a person skilled in the art understand solutions of the present disclosure better, the following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first", "second", and so on are intended to distinguish between similar objects but do not necessarily indicate a specific order or sequence. It is to be understood that the data termed in such a way are interchangeable in appropriate circumstances, so that the embodiments of the present disclosure described herein can be implemented in orders other than the order illustrated or described herein. Moreover, the terms "comprise", "include", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

The cloud technology is a hosting technology that unifies a series of resources such as hardware, software, and networks in a wide area network or a local area network to implement computing, storage, processing, and sharing of data.

Cloud computing is a delivery and usage mode of IT infrastructures, which is to obtain required resources by using a network in an on-demand and easily expandable manner. cloud computing in a broad sense is a delivery and usage mode of services, which is to obtain required services by using a network in an on-demand and easily expandable manner. Such services may be related to the IT, software, and the Internet, or may be other services. Cloud computing is a product of development and integration of conventional computer and network technologies such as grid computing, distributed computing, parallel computing, utility computing, network storage technologies, virtualization, load balance, and the like.

With the diversified development of the Internet, a real-time data stream, and connecting devices, and driven by the demand for search services, a social network, mobile commerce, and open collaboration, cloud computing develops rapidly. Different from the parallel distributed computing in the past, the generation of the cloud computing will theoretically promote revolutionary changes in the entire Internet mode and an enterprise management mode.

Cloud gaming, also referred to as gaming on demand, is an online gaming technology based on the cloud computing technology. The cloud gaming technology enables a thin client with relatively limited graphics processing and data computing capabilities to run a high-quality game. In a cloud gaming scenario, the game is run on the cloud server rather than a game terminal of a player, and the cloud server renders the game scenario into a video and audio stream, and transmits the video and audio stream to the game terminal of the player by using the network. The game terminal of the player is not required to have powerful graphics computing and data processing capabilities, but only required to have a basic streaming media playback capability and the capability of acquiring instructions inputted by the player and sending the instructions to the cloud server.

The solutions provided in the embodiments of the present disclosure relate to technologies such as the cloud computing and the cloud gaming, which are specifically described by using the following embodiments.

First, some nouns or terms used in the embodiments of the present disclosure are described.

A round-trip time (RTT) is used to describe a network delay of a round trip of a network packet from a user to a server.

An Internet data center (IDC) a service platform having complete devices (including a high-speed Internet access bandwidth, a high-performance local area network, a safe and reliable computer room environment, and the like), professional management, and complete applications.

Peering connection (PC) is a resource interworking service with a large bandwidth and high quality on the cloud. The PC has characteristics of multi-region, multi-account, heterogeneous interworking of a plurality of networks, and the like, and supports the interworking between a virtual private cloud (VPC) network and a basic network to satisfy deployment requirements of different services.

A global application acceleration platform (GAAP) relies on a high-speed channel, a forwarding cluster, and an intelligent routing technology among global nodes to implement nearby access for users in various places and to go directly to an origin site region through the high-speed channel, helping to resolve service problems of access freeze or an excessively long delay for global users.

The virtual private cloud (VPC) builds an isolated virtual network environment for an elastic cloud server that is independently configured and managed by users, to improve security of resources of the users on the cloud, and simplify network deployment of the users. In this way, an internal network can be conveniently managed and configured to make safe and fast network changes, thereby changing a multi-tenant architecture of a cloud service provider into a single-tenant architecture.

The cloud connect network provides an intranet interconnection service between the VPC networks and between the VPC and the IDC, which has the capabilities of full-mesh multi-point interconnection, routing self-learning, link optimization, rapid fault convergence, and the like. Compared with docking connection, the cloud connect network can implement interconnection among a plurality of VPCs.

A zone server is a server to which a player is directly connected, which is mainly responsible for processing of all non-single-round operations of users in the game application, including logic of login, purchase, backpack, mail, task processing, and the like.

A match server is responsible for a server process of single-round matching on matching requests of users in a global multiplayer game on a same server.

A player versus player (PvP) mode is a game mode in which a player fights against a player in a single round.

A domain name system (DNS) is a distributed network directory service, and is mainly used for mutual conversion of domain names and IP addresses.

Cloud load balancing (CLB) is a service of distributing traffic to a plurality of cloud servers, which may expand an external service capability of an application system by means of traffic distribution, and improve availability of the application system by eliminating the failure of single points.

A virtual IP (VIP) is an IP address at which the load balancer provides a service to a client.

The present disclosure is described below with reference to embodiments.

According to one aspect of the embodiments of the present disclosure, an account connecting method is provided. In an embodiment, the account connecting method may be applicable to a hardware environment composed of a server 101, a user terminal 103, and a connecting device 105 shown in FIG. 1. As shown in FIG. 1, the server 101 and the terminal 103 are connected to the connecting device 105 by using a network, so as to provide a service for the user terminal or a client installed on the user terminal. A target client may be a video client, an instant messaging client, a browser client, an education client, and the like. A database 107 may be disposed on the server or independently of the server to provide a data storage service for the server 101. The foregoing network may include but is not limited to a wired network and a wireless network. The wired network includes a local area network, a metropolitan area network, and a wide area network. The wireless network includes Bluetooth, WIFI, and other networks that can implement wireless communication. The user terminal 103 may be a terminal configured with the target client, which may include but is not limited to at least one of the following: a mobile phone (such as an Android mobile phone, an iOS mobile phone, or the like), a notebook computer, a tablet computer, a palmtop, a mobile Internet device (MID), a PAD, a desktop computer, a smart TV, or the like. The foregoing server may be a single server, or may be a server cluster composed of a plurality of servers, or a cloud server.

In an embodiment, the foregoing account connecting method includes: acquiring, on a first connecting device, a first data request transmitted by a first account, the first data request being a request to start a scene interaction in a target application; transmitting, on the first connecting device, the first data request to a first server of first type, the first server being configured to determine a first group of accounts as accounts about to participate in the scene interaction, and determine an address of a second server of second type, the second server being configured to create an interaction scene for realizing the scene interaction, the first group of accounts including accounts from a first group of different geographic regions, the first group of accounts including the first account, each account in the first group being used for transmitting a corresponding data request to the first server by using a corresponding connecting device, the corresponding data request being a request to start the scene interaction, and the corresponding connecting devices including connecting devices from a second group of different geographic regions; acquiring, on a target connecting device, the address of the second server transmitted by the first server after the interaction scene is created on the second server, network delays between the second server and the corresponding connecting devices being all less than a first delay threshold, and the target connecting device being a connecting device having a lowest network delay with the first account; and transmitting, on the target connecting device, the address of the second server to the first account, and forwarding, to the second server, interaction data in the scene interaction transmitted by the first account.

In an embodiment, the method in this embodiment of the present disclosure may be applicable to a game scenario. The target application may be a target game application. A request to start a scene interaction may be a request to start a game. Creating an interaction scene for realizing a scene interaction may be creating a game. An account about to participate in a scene interaction may be an account about to participate in a game. That is, the first group of accounts may be accounts about to participate in a game. Forwarding the interaction data in a scene interaction transmitted by the first account may be forwarding game interaction data in a game transmitted by the first account.

In other embodiments, the method may also be applicable to a livestreaming scenario or an online conference scenario. Then, the target application may be a target livestreaming application or a target conference application. The request to start a scene interaction may be a request to start a livestreaming or an online conference. The creating an interaction scene for realizing a scene interaction may be creating a livestreaming interaction scene for realizing a livestreaming or creating a conference interaction scene for realizing an online conference. The account about to participate in a scene interaction may be an account about to participate in a livestreaming or a conference. That is, the first group of accounts may be accounts about to participate in a livestreaming or a conference. The interaction data in the scene interaction may be a livestreaming or livestreaming interaction data in a conference or conference interaction data.

According to this embodiment, the first data request transmitted by the first account is acquired on the first connecting device, and is transmitted to the first server of first type. The first server determines accounts (including the first account) from different geographic regions as the accounts about to participate in a scene interaction. The accounts in the different geographic regions about to participate in the same scene interaction, by using corresponding connecting devices in the different geographic regions, the first server to start the scene interaction. The address of the second server transmitted by the first server is acquired on the target connecting device after the interaction scene for realizing the scene interaction is created on the second server, the address of the second server is transmitted to the first account, and the interaction data in the scene interaction transmitted by the first account is forwarded to the second server. That is, the connecting devices are bound across domains, and the interaction data required to be exchanged is forwarded between a target application and an associated server by using a target connecting device having a lowest network delay with an account with which the connecting device is required to interact. In this way, the accounts in the different geographic regions are connected to the same interaction scene to perform a scene interaction, and an average network delay of a plurality of accounts in the different geographic regions during the scene interaction is reduced.

In an embodiment, the transmitting, on the first connecting device, the first data request to a first server of first type includes: transmitting, on a first CLB, the first data request to the first server by using a cloud connect network when the first connecting device is the first CLB. The first CLB is located in a first geographic region in the first group of different geographic regions.

In an embodiment, the transmitting, on a first CLB, the first data request to the first server by using a cloud connect network includes: transmitting, on the first CLB, the first data request to a second CLB by using the cloud connect network, the second CLB being connected to a plurality of servers in a first server cluster where the first server is located; transmitting, on the second CLB, the first data request to a third type of third server in the first server cluster, the third server being configured to provide a service other than a single scene interaction in the target application; and transmitting, on the third server, the first data request to the first server.

It is to be understood that in the game scenario, a single scene interaction may be a single-round game. That is, the third server is configured to provide a game service other than the single-round game in the target game application.

In an embodiment, before the first data request transmitted by the first account is acquired on the first connecting device, the method further includes: acquiring, on the first connecting device, a first login request transmitted by the first account; transmitting, on the first connecting device, the first login request to a third server in the first server cluster; acquiring, on the first connecting device, target data transmitted by the third server, the target data including data of the first account in the target application acquired by the third server from a target database; and transmitting, on the first connecting device, a first login response to the first account, the first login response being used for indicating successful login to the first account, and the first login response including the target data.

It is to be understood that in the game scenario, the target data may be target game data. That is, the target game data transmitted by the third server is acquired on the first connecting device. The target game data includes game data of the first account in a target game application acquired by the third server from the target database.

In an embodiment, the transmitting, on the first connecting device, the first data request to a first server of first type includes: transmitting, on a first global application acceleration platform (GAAP), the first data request to the first server by using a second CLB when the first connecting device is the first GAAP. The second CLB is connected to a plurality of servers in a first server cluster, the plurality of servers include the first server, the first server cluster is connected to a plurality of CLBs by using a cloud connect network, and the plurality of CLBs are respectively located in different geographic regions.

In an embodiment, after the first data request is transmitted to the first server of first type on the first connecting device, the method further includes: acquiring a list of first group of network delays on the first server, the list of first group of network delays including a network delay during data transmission between a connecting device corresponding to each account in the first group and each of a plurality of second type servers; and determining an address of a second type server having a lowest network delay as the address of the second server when the first group of accounts are the same account.

In an embodiment, the method further includes: acquiring identifiers of second type servers having a lowest network delay with connecting devices corresponding to all of a plurality of accounts when the first group of accounts include the plurality of accounts, to obtain a plurality of second type server identifiers; and determining, when a quantity of the second type server identifiers indicating the same second type server exceeds a first threshold, an address of the same indicated second type server as the address of the second server.

In an embodiment, the method further includes: determining the address of the second type server in the plurality of second type servers having a highest network delay evaluation parameter as the address of the second server when the quantity of the second type server identifiers indicating the same second type server does not exceed the first threshold.

In an embodiment, the method further includes: acquiring, on the first connecting device, a second data request transmitted by the first account, the second data request being a request to add target virtual objects to the scene interaction; transmitting, on the first connecting device, the second data request to the first server, the first server being further configured to determine the address of the second server as an address of a fourth type of fourth server, and the fourth server being configured to create the target virtual objects; transmitting, on the target connecting device, the address of the fourth server to the first account, and forwarding, to the fourth server, the interaction data in the scene interaction transmitted by the first account; and creating, by the fourth server, the target virtual objects under a preset condition according to the interaction data.

It is to be understood that, in the game scenario, the target virtual objects may be target virtual game objects. The interaction data is the game interaction data. The second data request is used for requesting to add the target virtual game objects to a game. The fourth server creates the target virtual game objects under a preset condition according to the game interaction data.

In an embodiment, the preset condition includes at least one of the following:
- a quantity of the target virtual objects in the scene interaction is less than a first quantity threshold;
- an account in the first group of accounts having a connection failure number exceeding a second quantity threshold exists in the scene interaction; and
- an account in the first group of accounts having an attribute being a target account exists in the scene interaction, the target account being an account that is required to interact with the target virtual objects.

In an embodiment, in the game scenario, the scene interaction in the foregoing preset conditions may be a game, and the target virtual objects may be the target virtual game objects.

In an embodiment, the method further includes: acquiring, on the first connecting device, a third data request transmitted by the first account, the third data request being a request to record a video of the scene interaction; transmitting, on the first connecting device, the third data request to the first server, the first server being further configured to determine the address of the second server as an address of a fifth type of fifth server, and the fifth server being configured to create a video file of the scene interaction; transmitting, on the target connecting device, the address of the fifth server to the first account, and forwarding, to the fifth server, the interaction data in the scene interaction transmitted by the first account; and creating, by the fifth server, the video file of the scene interaction according to the interaction data.

In an embodiment, in the game scenario, the scene interaction may be a game, and the interaction data may be the game interaction data. The interaction data in the scene interaction may be the game interaction data in a game.

Now an application executed on the target client is a game application by way of example. A target game application 109 is displayed by using the user terminal 103, and the account in the game application may be used to access the service from an entry of the target game application 109 configured on the terminal. The foregoing is merely an example, which is not limited in this embodiment.

Figure 2:
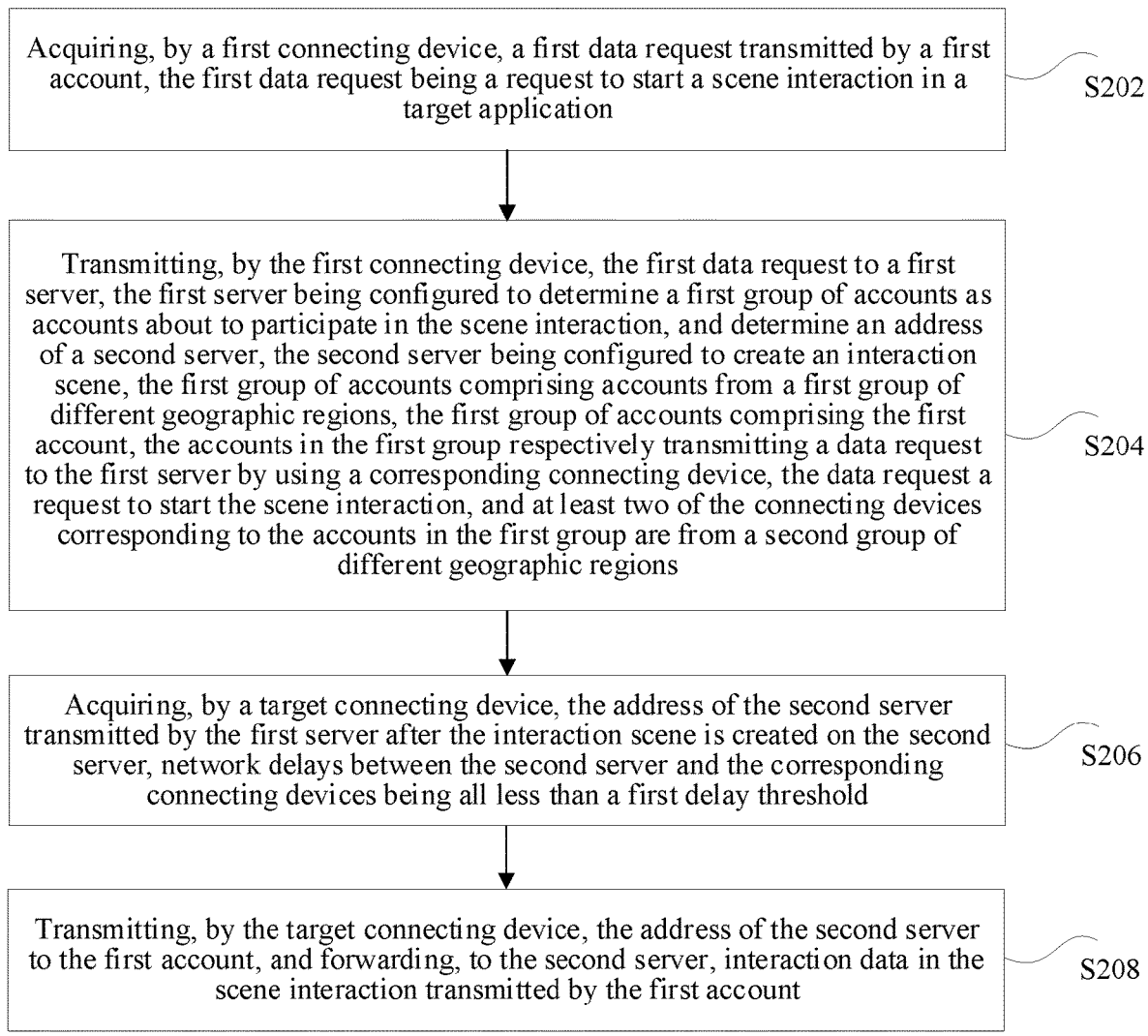
FIG. 2 is a schematic flowchart of an account connecting method according to an embodiment.

In an embodiment, as shown in FIG. 2, the account connecting method includes the following steps.

S202: Acquire, on a first connecting device, a first data request transmitted by a first account, the first data request being a request to start a game in a target game application.

In an embodiment, the first connecting device and the target connecting device may include, but are not limited to, a GAAP connecting device or a CLB connecting device. The first connecting device and the target connecting device may be the same or different. The target game application may include, but is not limited to, a shooting game application, a chess and card game application, a role play game application, a strategy game application, and the like, or may be a combination of the plurality of types of game applications. The first account may include, but is not limited to, an account that has been preregistered with a relevant server of the game application, or may include, but is not limited to, an account that has been registered with the relevant server of the game application while the data request is being transmitted. The foregoing description is only an example and is not limited in this embodiment.

In an embodiment, the first data request may include, but is not limited to, a request to start a game, or the first group of accounts formed by the first account with other accounts for requesting to start the game. The other accounts and the first account may be in the same geographic region or in different geographic regions.

S204: Transmit, on the first connecting device, the first data request to a first server of first type, the first server being configured to determine a first group of accounts as accounts about to participate in the game, and determine an address of a second server of second type, the second server being configured to create a game, the first group of accounts including accounts from a first group of different geographic regions, the first group of accounts including the first account, each account in the first group being used for transmitting a corresponding data request to the first server by using a corresponding connecting device, the corresponding data request being a request to start the game, and the corresponding connecting devices including connecting devices from a second group of different geographic regions.

In an embodiment, the first type of server may include, but is not limited to, a zone server or a pre-configured server for performing game account matching. The second type of server may include, but is not limited to, a PvP server, a player versus environment (PvE) server, and the like configured to create a game and exchange game data with a corresponding server participating in the game.

In an embodiment, each account in the first group corresponds to a connecting device. Locations where the connecting device corresponding to the each account and each account are located may include but are not limited to the same geographic region or adjacent geographic regions. A network delay of the each account with the connecting device corresponding to the account is less than a network delay of the each account with other connecting devices except the connecting device corresponding to the account. In other words, the each account corresponds to a connecting device in a plurality of connecting devices having a lowest network delay. Since the data is transmitted by using a network, geographic regions where the each account and the connecting device corresponding to the account having the lowest network delay are located are geographic regions relatively close to each other.

S206: Acquire, on the target connecting device, the address of the second server transmitted by the first server after the game is created on the second server, network delays between the second server and the corresponding connecting devices being all less than a first delay threshold.

The target connecting device is a connecting device having a lowest network delay with the first account. It is to be understood that when the network delay between the first connecting device and the first account is the lowest, then the target connecting device may be the first connecting device. When the network delay between one of the other connecting devices and the first account is the lowest, then the first connecting device is not the target connecting device.

In an embodiment, the first delay threshold may be preset by the system, and a specific value may be set separately according to different game applications. For example, in a shooting game application, the first delay threshold is set to a smaller threshold. In this way, users in wider geographic regions can play a game on the same server as much as possible while ensuring game experience of a participant. In an education game application, the first delay threshold is set to a larger threshold, so as to allow more worldwide users to participate in the game with a relatively normal network delay. The foregoing is merely an example, and a specific game application scenario is not limited in the present disclosure.

In an embodiment, the first server determines the network delay between each account in the first group and each of second type servers according to the first data request, determines the second type server in the plurality of second type servers having a highest network delay parameter as the second server, and then acquires the address of the second server. The network delay parameter may be automatically determined by the system according to the network delay.

S208: Transmit, on the target connecting device, the address of the second server to the first account, and forward, to the second server, game interaction data in the game transmitted by the first account.

The game interaction data may include, but is not limited to, the game interaction data transmitted to the server by each account participating in the current game during the game. The target game application is used as a chess and card game by way of example. The game interaction data may include, but is not limited to, game data such as card information of the first account, chat information of the first account, a name of the first account, a head portrait, virtual items in a backpack, and the like that can perform interaction.

According to this embodiment, the first data request transmitted by the first account is acquired on the first connecting device, and is transmitted to the first server of first type. The first server determines accounts (including the first account) from different geographic regions as the accounts about to participate in the game. The accounts in the different geographic regions about to participate in the same game, by using corresponding connecting devices in the different geographic regions, the first server to start the game. After the game is created on the second server, the address of the second server transmitted by the first server is acquired on the target connecting device, the address of the second server is transmitted to the first account, and the game interaction data in the game transmitted by the first account is forwarded to the second server. That is, the connecting devices are bound across domains, and the game data required to be exchanged is forwarded between a target game application and an associated server by using a target connecting device having a lowest network delay with an account with which the connecting device is required to play the game. In this way, the accounts in the different geographic regions are connected to the same game to perform interaction, and an average network delay of a plurality of accounts in the different geographic regions during the game is reduced.

In one embodiment, the transmitting, on the first connecting device, the first data request to a first server of first type includes: transmitting, on a first CLB, the first data request to the first server by using a cloud connect network when the first connecting device is the first CLB. The first CLB is located in a first geographic region in the first group of different geographic regions, and the first server cluster where the first server is located is connected to a plurality of CLBs by using the cloud connect network. The plurality of CLBs include the first CLB, and the plurality of CLBs are respectively located in different geographic regions.

In an embodiment, when the first connecting device and the first server use a same operator service, the first connecting device is determined as the first CLB. The first CLB may be bound to the corresponding geographic region by means of cross-domain binding. The binding relationship is registered and stored in a DNS server. During the data exchange by using a domain name by the first account, a CLB address having a lowest delay with the first account is obtained by means of DNS server resolution, and the first data request is forwarded to the first server by using the CLB.

Figure 3:
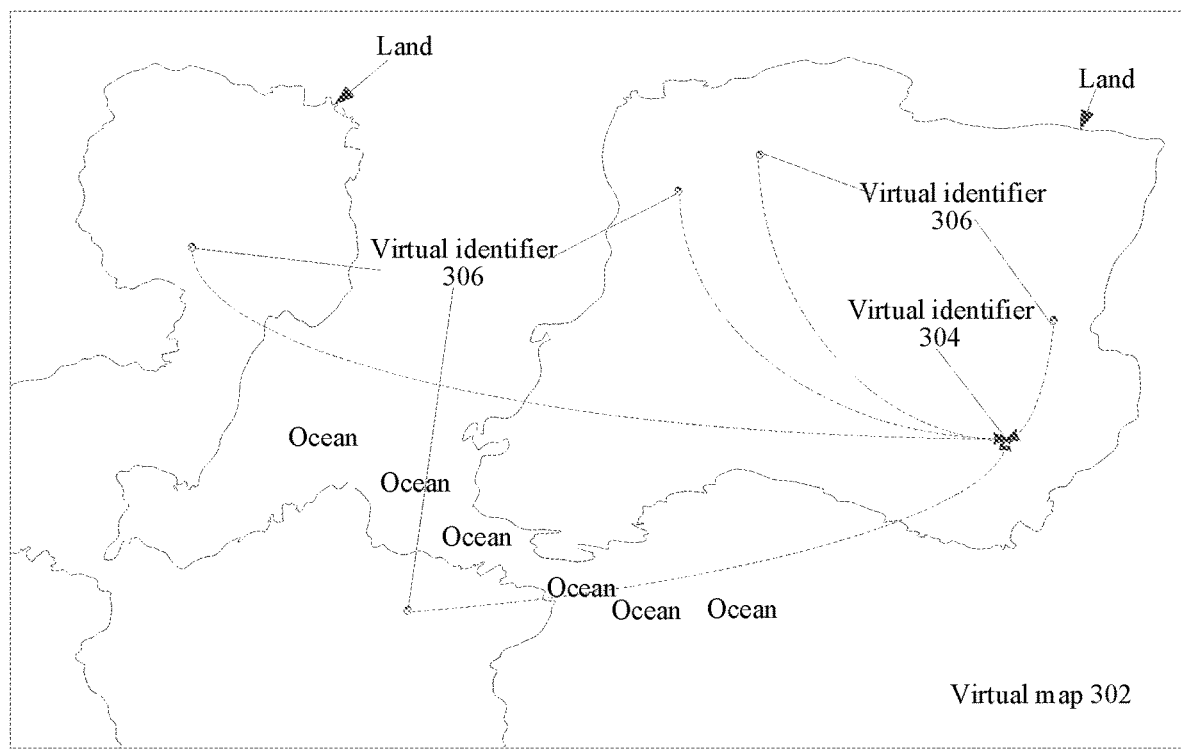
FIG. 3 is a schematic diagram of an account connecting method according to an embodiment.

In an embodiment, FIG. 3 is a schematic diagram of an example account connecting method according to an embodiment of the present disclosure. As shown in FIG. 3, a virtual map 302 is used for representing location information of a server associated with a target game application. A virtual identifier 304 is used for representing a geographic location of the first server in this embodiment. When the first account is located in the geographic region near the virtual identifier 304 in FIG. 3, the address of the second server is determined as an address of a second type server corresponding to the geographic region of the virtual identifier 304. CLBs corresponding to a plurality of virtual identifiers 306 are connected to each other by using corresponding special lines in a form of cloud networking.

According to this embodiment, the CLBs are bound across domains to forward the first data request between a terminal where the account is located and the first server corresponding to the first data request. As a result, the problem that users around the world are difficult to connect or connect with a relatively low delay is resolved, so that the users may access an optimal (usually a nearest) virtual private cloud for data exchange by means of the DNS resolution. In this way, the account connecting delay is reduced, and accounts in a plurality of different geographic regions can play games on the same server.

In one embodiment, the transmitting, on a first CLB, the first data request to the first server by using a cloud connect network includes: transmitting, on the first CLB, the first data request to a second CLB by using the cloud connect network, the second CLB being connected to a plurality of servers in a first server cluster; transmitting, on the second CLB, the first data request to a third server in the first server cluster, the third server being configured to provide a game service other than a single-round game in the target game application; and transmitting, on the third server, the first data request to the first server.

In an embodiment, the disaster tolerance capability of a point-to-point special line failure is implemented by introducing the "cloud networking" solution. For example, when the first CLB is located in Silicon Valley, the second CLB is located in Frankfurt, and the third server is located in Singapore, when the special line from Silicon Valley to Singapore fails, automatic dispatch is performed from Silicon Valley to Frankfurt, and then a data exchange service is performed by using a special line from Frankfurt to Singapore.

In one embodiment, before the first data request transmitted by the first account is acquired on the first connecting device, the method further includes: acquiring, on a first CLB, a first login request transmitted by the first account; transmitting, on the first CLB, the first login request to a third server in the first server cluster, the third server being configured to provide a game service other than a single-round game in the target game application; acquiring, on the first CLB, target game data transmitted by the third server, the target game data including game data of the first account in the target game application acquired by the third server from a target database; and transmitting, on the first CLB, a first login response to the first account, the first login response being used for indicating successful login to the first account, and the first login response including the target game data.

In an embodiment, the third server may include, but is not limited to, a zone server, that is, used in a public service cluster. In the related art, a connection from a user side to the public service cluster is implemented by using a public network link. However, in this embodiment, the login request for connecting the public service cluster is forwarded by using the CLB, and the CLB is used to implement data forwarding between the user side and the public service cluster. The CLB is connected to the third server by using the special line.

Figure 4:
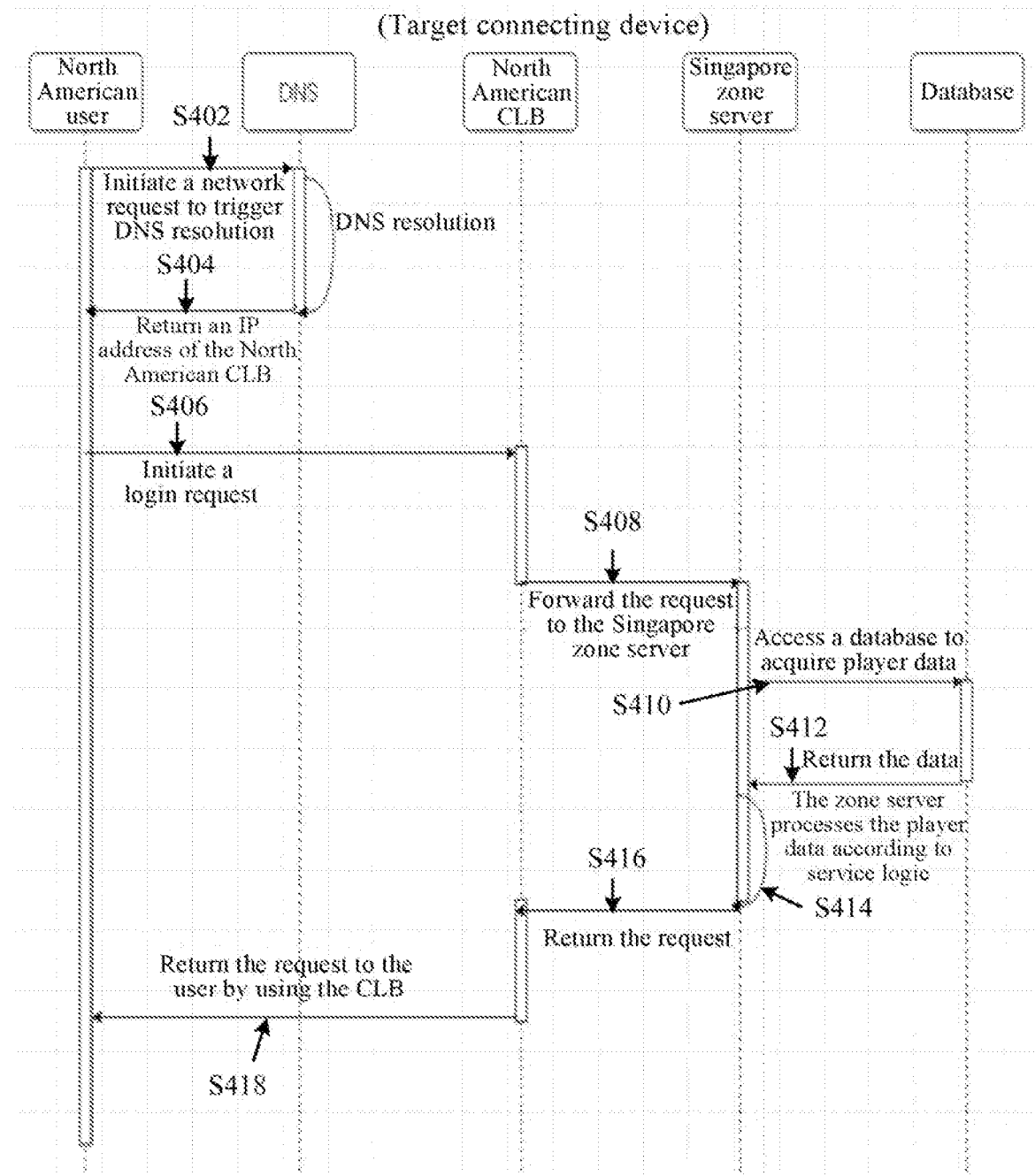
FIG. 4 is a schematic flowchart of an account connecting method according to another embodiment.

In one embodiment, FIG. 4 is a schematic flowchart of another example account connecting method according to an embodiment of the present disclosure. As shown in FIG. 4, a further description is given by using the first account as a North American user by way of example.

S402: A North American user (corresponding to the first account) initiates a network request (e.g., a login request) to trigger DNS resolution.

S404: A DNS server returns an IP address (a VIP address) of a North American CLB (corresponding to the target connecting device) to the North American user according to an IP address of the North American user.

S406: Acquire the login request initiated by the North American user.

S408: The North American CLB forwards the login request to a Singapore zone server (corresponding to the third server).

S410: The Singapore zone server accesses a database according to the login request to acquire user data.

S412: The database returns the user data to the Singapore zone server.

S414: The zone server processes the user data according to service logic.

S416: The Singapore zone server returns login response information to the North American CLB.

S418: Return the login response information to the North American user by using the North American CLB.

According to this embodiment, when accessing the public service cluster from the user-side target game application is required to be implemented by using the public network link in the related art, the technical problem of freeze during association of some game accounts with the public service cluster due to the request delay of the account being positively correlated with the distance from the account to the public service and routing quality of the public network link can be resolved.

In one embodiment, the transmitting, on the first connecting device, the first data request to a first server of first type includes: transmitting, on a first global application acceleration platform (GAAP), the first data request to the first server by using a second CLB when the first connecting device is the first GAAP. The second CLB is connected to a plurality of servers in a first server cluster, the plurality of servers include the first server, the first server cluster is connected to a plurality of CLBs by using a cloud connect network, and the plurality of CLBs are respectively located in different geographic regions.

In an embodiment, when the first connecting device and the first server use different operator services, the first connecting device is determined as the first GAAP. The first GAAP may be directly connected to the second CLB and then connected to the first server cluster including the first server. In other words, the first account is connected to the first server cluster by using the GAAP by using the special line between different operators. An address of the GAAP is registered and stored in the DNS server. During the data exchange by using a domain name by the first account, an address of the GAAP having a lowest delay with the first account is obtained by means of the DNS server resolution, and the first data request is forwarded to the first server by using the GAAP.

Figure 5:
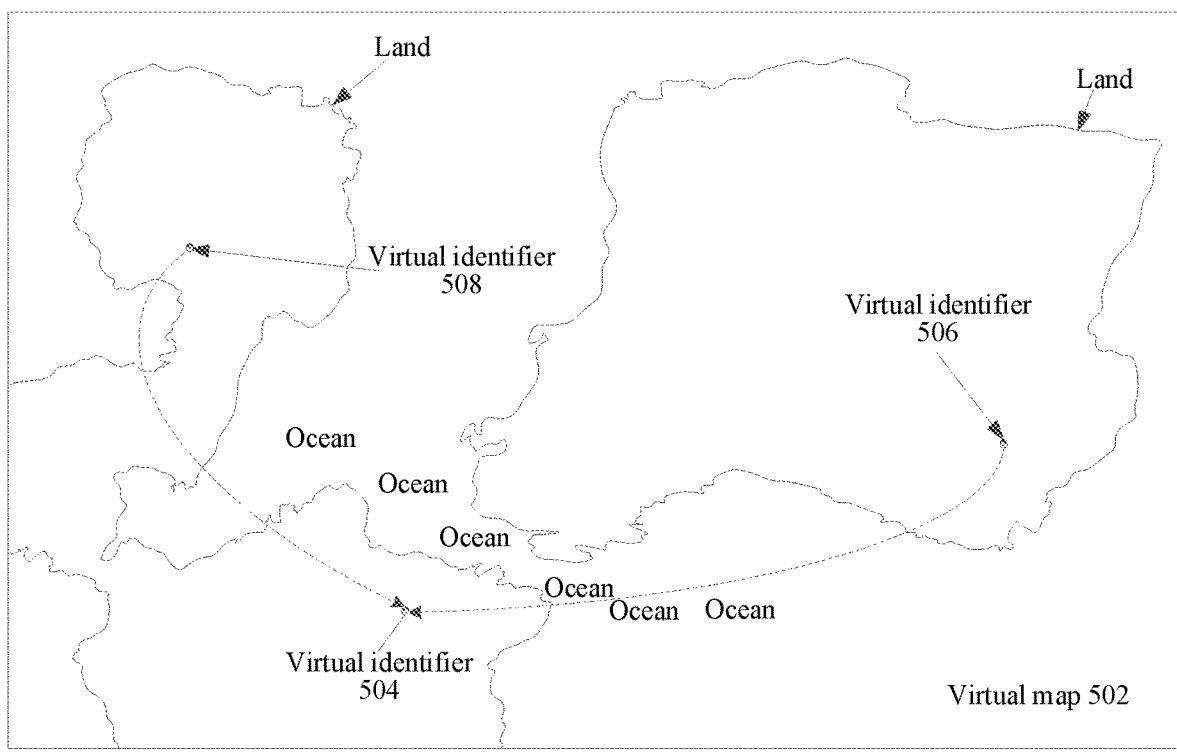
FIG. 5 is a schematic diagram of an account connecting method according to another embodiment.

In an embodiment, FIG. 5 is a schematic diagram of another example account connecting method according to an embodiment of the present disclosure. As shown in FIG. 5, a virtual map 502 is used for representing location information of a server associated with a target game application, a virtual identifier 504 is used for representing a geographic location of the first GAAP in this embodiment, a virtual identifier 506 is used for representing a geographic location of the first server in this embodiment, and a virtual identifier 508 is used for representing a geographic location of the second CLB in this embodiment. When the first account is located in the geographic region near the virtual identifier 504 in FIG. 5, the address of the second server is determined as the address of the second type server corresponding to the geographic region of the virtual identifier 504. The first GAAP corresponding to the virtual identifier 504 is connected to the CLB or the server corresponding to the virtual identifier 506 and the virtual identifier 508 by using the special lines corresponding to different operators.

According to this embodiment, an account of the GAAP is required to be used for being directly connected to the CLB in Singapore from the GAAP in South America by using the special line, and then directly accesses the zone server. In this way, the account can be connected to the public service cluster in Singapore from Silicon Valley without a detour from South America to Silicon Valley, so that the technical problem of interconnection of VPCs between different cloud providers is resolved.

In one embodiment, before the first data request transmitted by the first account is acquired on the first connecting device, the method further includes: acquiring, on a first GAAP, a second login request transmitted by the first account; transmitting, on the first GAAP, the second login request to a third server in the first server cluster, the third server being configured to provide a game service other than a single-round game in a target game application; acquiring, on the first GAAP, target game data transmitted by the third server, the target game data including game data of the first account in the target game application acquired by the third server from a target database; and transmitting, on a first CLB, a second login response to the first account, the second login response being used for indicating successful login to the first account, and the second login response including the target game data.

In an embodiment, the third server may include, but is not limited to, a zone server, that is, used in a public service cluster. In the related art, a connection from a user side to the public service cluster is implemented by using a public network link. However, in this embodiment, the login request for connecting to the public service cluster is forwarded by using the GAAP, and the GAAP is used to implement data forwarding between the user side and the public service cluster. The GAAP is connected to the third server by using the special line.

Figure 6:
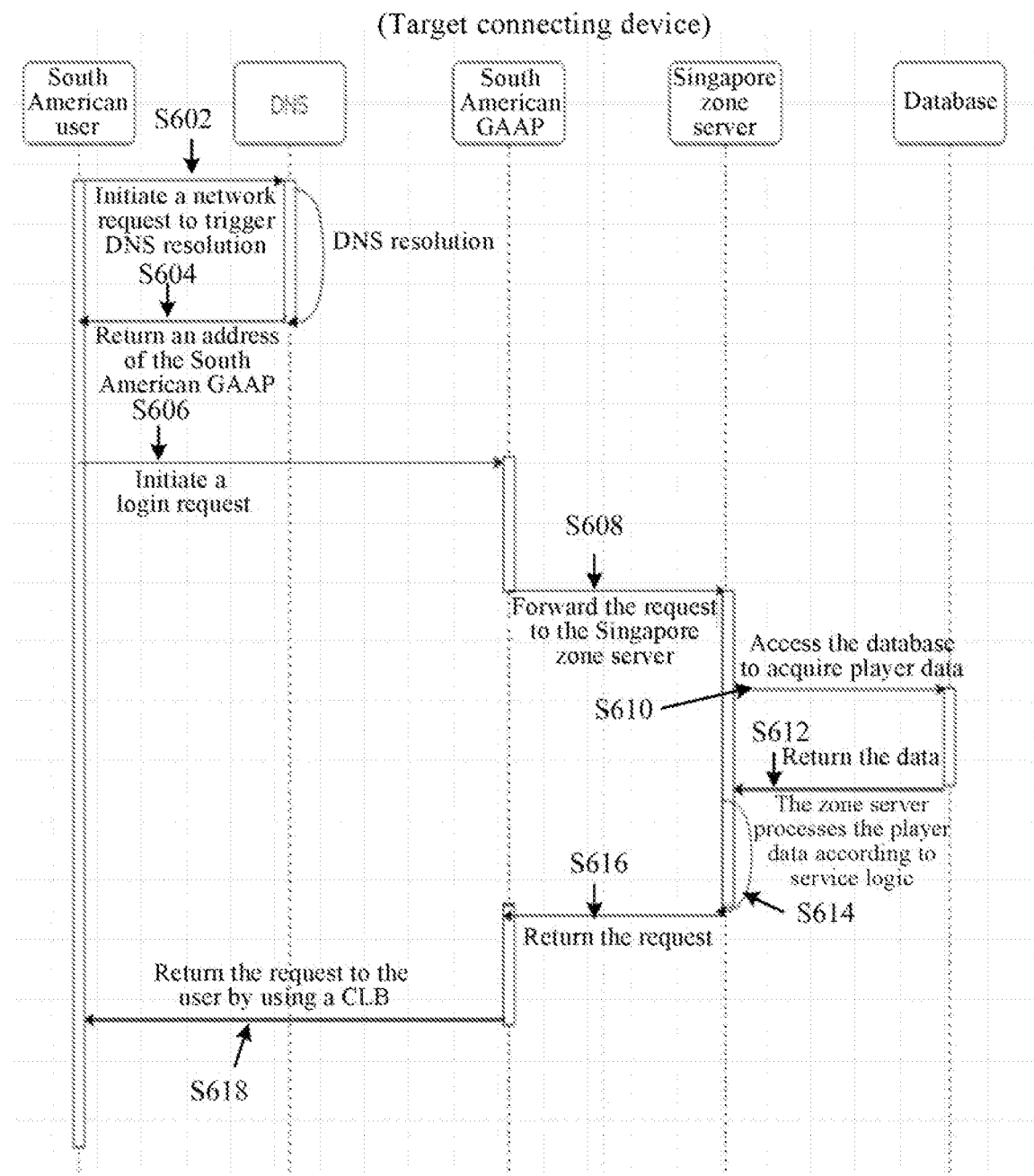
FIG. 6 is a schematic flowchart of an account connecting method according to another embodiment.

In one embodiment, FIG. 6 is a schematic flowchart of still another example account connecting method according to an embodiment of the present disclosure. As shown in FIG. 6, a further description is given by using the first account as a South American user by way of example.

S602: A South American user (corresponding to the first account) initiates a network request (e.g., a login request) to trigger DNS resolution.

S604: A DNS server returns an IP address of a South American GAAP to the South American user according to an IP address of the South American user.

S606: Acquire the login request initiated by the South American user.

S608: The South American GAAP (corresponding to the target connecting device) forwards the login request to a Singapore zone server (corresponding to the third server).

S610: The Singapore zone server accesses a database according to the login request to acquire user data.

S612: The database returns the user data to the Singapore zone server.

S614: The zone server processes the user data according to service logic.

S616: The Singapore zone server returns login response information to the South American GAAP.

S618: Return the login response information to the South American user by using the South American GAAP.

According to this embodiment, when accessing the public service cluster from the user-side target game application is required to be implemented by using the public network link in the related art, the technical problem of freeze during association of some game accounts with the public service cluster due to the request delay of the account being positively correlated with the distance from the account to the public service and routing quality of the public network link can be resolved, thereby achieving the technical effect of reducing the user network delay.

In one embodiment, after the first data request is transmitted to a first server of first type on the first connecting device, the method further includes: acquiring, on the first server, a list of first group of network delays during data transmission between a connecting device corresponding to each account in the first group and each of a plurality of second type servers; determining an address of the second type server having a lowest network delay as an address of the second server when the first group of accounts include one account, and network delays between a connecting terminal corresponding to the account and the plurality of second type servers are recorded in the list of first group of network delays; or acquiring identifiers of a plurality of second type servers having a lowest delay in the network delays between connecting devices corresponding to all of the plurality of accounts and the plurality of second type servers when the first group of accounts include a plurality of accounts, and network delays between the connecting devices corresponding to all of the plurality of accounts and the plurality of second type servers are recorded in the list of first group of network delays; determining the address of the second type server corresponding to the second type server identifier as the address of the second server when a quantity of identifiers in the plurality of second type server identifiers indicating the same second type server exceeds a first threshold; and determining the address of the second type server in the plurality of second type servers having a highest network delay evaluation parameter as the address of the second server when the quantity of identifiers in the plurality of second type server identifiers indicating the same second type server does not exceed the first threshold.

In an embodiment, when the first group of accounts include one account, the plurality of connecting devices corresponding to the account are sorted according to the network delays, and the connecting device having the lowest network delay is determined as the connecting device corresponding to the account.

In an embodiment, when the first group of accounts include a plurality of accounts, the first group of accounts include a first account located in Southeast Asia, a second account located in North America, and a third account located in South America. The connecting device corresponding to the first account is set in Southeast Asia, the connecting device corresponding to the second account is set in North America, and the connecting device corresponding to the third account is set in South America. A network delay between the first account and the connecting device in South America is 300 ms, a network delay between the first account and the connecting device in North America is 200 ms, and a network delay between the first account and the connecting device in Southeast Asia is 50 ms. For the first account, the network delay parameter corresponding to the connecting device in South America is set to 40, the network delay parameter corresponding to the connecting device in North America is set to 70, and the network delay parameter corresponding to the connecting device in Southeast Asia is set to 100. For the second account, the network delay between the second account and the connecting device in South America is 100 ms, the network delay with the connecting device in North America is 50 ms, and the network delay with the connecting device in Southeast Asia is 200s. Then the network delay parameter corresponding to the connecting device in South America is set to 85, the network delay parameter corresponding to the connecting device in North America is set to 100, and the network delay parameter corresponding to the connecting device in Southeast Asia is set to 40. According to the foregoing operations, the network delay parameters of the connecting devices in Southeast Asia are determined as 210 in total, and the network delay parameters of the connecting devices in North America are determined as 225 in total. Since the network delay parameter of the connecting device located in North America is higher than the network delay parameter of the connecting device located in Southeast Asia, the second server is determined as the second type server located in North America, and the address of the second type server is acquired as the address of the second server.

The foregoing is merely an example. A specific method for selecting an optimal second type server may further include, but is not limited to, other second type servers that can indicate that the determined network delay of the second type server is optimal relative to the plurality of accounts, which is not specifically limited in this embodiment.

In an embodiment, the first threshold and the second threshold may be the same or different, which is not specifically limited in the present disclosure.

According to this embodiment, the optimal second type server is directly selected by using a hand raising mechanism, and when the optimal second type server cannot be directly selected, the corresponding network delay parameter is configured for each second type server, and then the address of the second server is determined. In this way, the efficiency is improved, and a waste of system resources caused by repeated determination is avoided.

In one embodiment, the method further includes: acquiring, on the first connecting device, a second data request transmitted by the first account, the second data request being a request to add target virtual game objects to a game; transmitting, on the first connecting device, the second data request to the first server, the first server being further configured to determine the address of the second server as an address of a fourth type of fourth server, and the fourth server being configured to create the target virtual game objects; transmitting, on the target connecting device, the address of the fourth server to the first account, and forward, to the fourth server, game interaction data in the game transmitted by the first account; and creating, by the fourth server, the target virtual game objects under a preset condition according to the game interaction data, the preset condition including at least one of the following: a quantity of target virtual game objects in a game is less than a first quantity threshold; an account in the first group of accounts having a connection failure number exceeding a second quantity threshold exists in the game; and an account in the first group of accounts having an attribute being a target account exists in the game, the target account being an account that is required to interact with the target virtual game objects.

In an embodiment, the fourth server is configured to configure, in the game, the target virtual objects capable of simulating behaviors of virtual objects controlled by the first account. During the PvP operation, in some scenarios (such as an insufficient number of players, an excessively large number of user connection failures, and new players required to be guided), it is necessary to add a special target virtual operation object to enter the game. The fourth server and the second server are deployed in the same VPC, so that the overheads of special line traffic can be reduced, thereby reducing operating costs.

In one embodiment, the method further includes: acquiring, on the first connecting device, a third data request transmitted by the first account, the third data request being a request to record a video of the game; transmitting, on the first connecting device, the third data request to the first server, the first server being further configured to determine the address of the second server as an address of a fifth type of fifth server, and the fifth server being configured to create a video file of the game; transmitting, on the target connecting device, the address of the fifth server to the first account, and forwarding, to the fifth server, game interaction data in the game transmitted by the first account; and creating, by the fifth server, the video file of the game according to the game interaction data.

In an embodiment, the fifth server is configured to save a single-round operation of the account in the game, and a video file is formed for the user to review and share after the single round ends. The fifth server and the second server are deployed in the same VPC, so that the overheads of special line traffic can be reduced, thereby reducing the costs.

According to this embodiment, modules that frequently interact with the second server and can be decoupled from the public cluster are adjusted to each VPC, so that the traffic of the special line can be reduced. In addition, for a scenario where process restart requires a lot of reading and writing from the public cluster, the method of dispersing the requests is adopted to achieve cost optimization.

The present disclosure is further described below with reference to specific embodiments.

Figure 7:
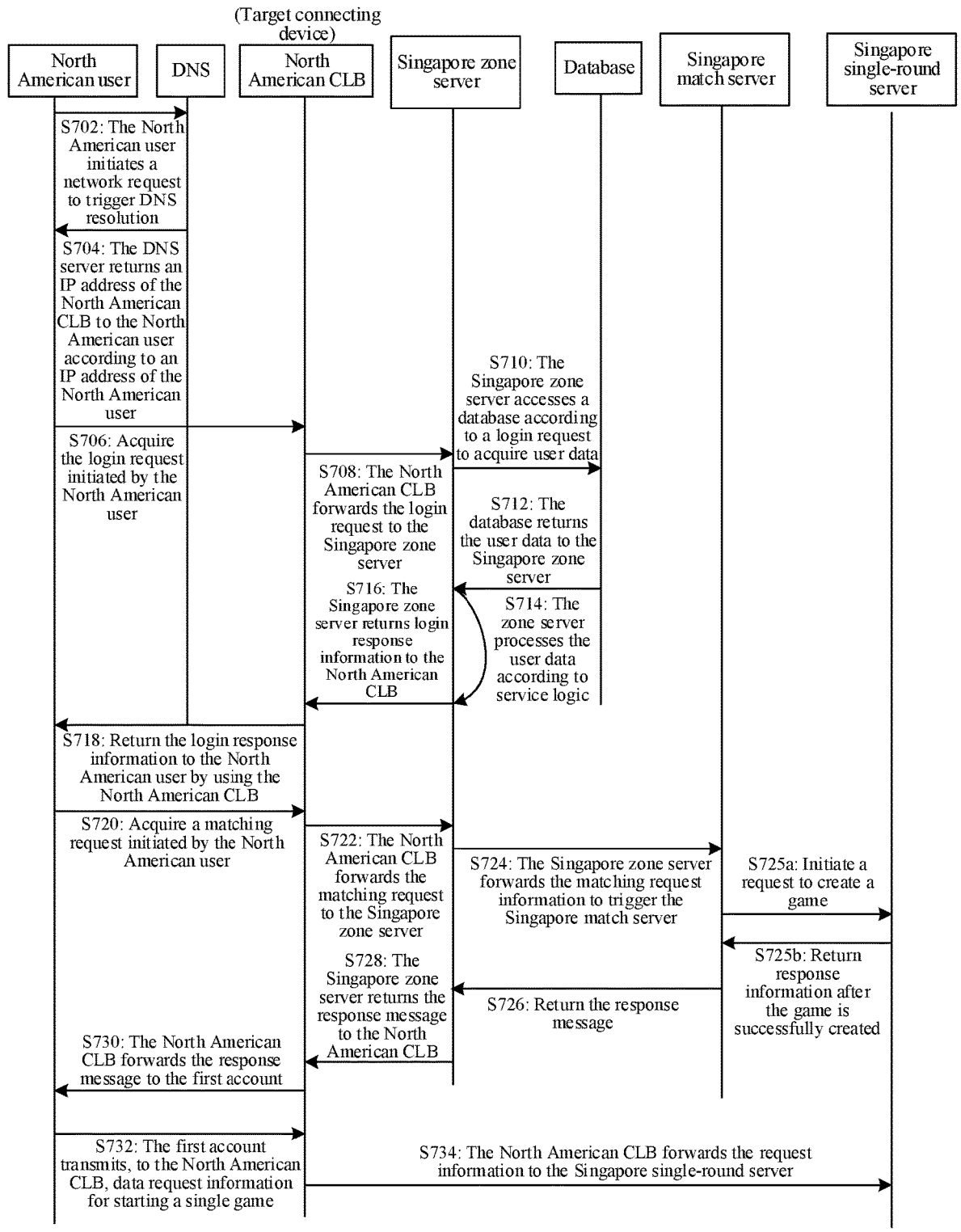
FIG. 7 is a schematic diagram of an account connecting method according to still another embodiment.

FIG. 7 is a schematic flowchart of still another example account connecting method according to an embodiment of the present disclosure. As shown in FIG. 7, a further description is given by using the first account as a North American user by way of example.

S702: A North American user initiates a network request (e.g., login request) to trigger DNS resolution.

S704: A DNS server returns an IP address of a North American CLB (corresponding to a first connecting device) to the North American user according to an IP address of the North American user.

S706: Acquire the login request initiated by the North American user.

S708: The North American CLB forwards the login request to a Singapore zone server (corresponding to the third server).

S710: The Singapore zone server accesses a database according to the login request to acquire user data.

S712: The database returns the user data to the Singapore zone server.

S714: The zone server processes the user data according to service logic.

S716: The Singapore zone server returns login response information to the North American CLB.

S718: Return the login response information to the North American user by using the North American CLB.

S720: Acquire a matching request (corresponding to the first data request) initiated by the North American user.

S722: The North American CLB forwards the matching request to the Singapore zone server.

S724: The Singapore zone server forwards the matching request information to a Singapore match server (corresponding to the first server).

S725$a$: The Singapore match server transmits, to a Singapore single-round server (corresponding to the second server), a request to establish a game.

S725$b$: Return, to the Singapore match server, a response message indicating successful creation after the Singapore single-round server creates a game after determining that a number of players is sufficient.

S726: The Singapore match server returns the response message to the Singapore zone server.

S728: The Singapore zone server returns the response message to the North American CLB.

S730: The North American CLB forwards the response message to the first account.

S732: The first account transmits, to the North American CLB, data request information for starting a single-round game.

S734: The North American CLB forwards the request information to the Singapore single-round server (corresponding to the second server).

The network delays corresponding to accounts in different geographic regions can be counted by using the solutions, and then targeted configuration is performed for a region having a relatively high network delay, so as to achieve the technical effect of data transmission in the case of a lower network delay.

For ease of description, the foregoing method embodiments are stated as a series of action combinations. However, a person skilled in the art is to learn that the present disclosure is not limited to the described sequence of the actions, because according to the present disclosure, some steps may use another sequence or may be simultaneously performed. In addition, a person skilled in the art is also to learn that the embodiments described in this specification are all exemplary embodiments, and the involved actions and modules are not necessarily required to the present disclosure.

Figure 8:
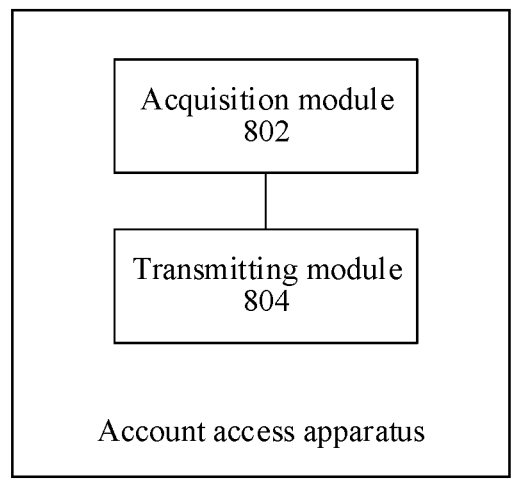
FIG. 8 is a schematic structural diagram of an account connecting apparatus in a game application according to an embodiment.

According to another aspect of the embodiments of the present disclosure, an account connecting apparatus in a target application for implementing the account connecting method is further provided, disposed in an electronic device. As shown in FIG. 8, the apparatus includes:

an acquisition module 802, configured to acquire, on a first connecting device, a first data request transmitted by a first account, the first data request being a request to start a scene interaction in a target application;

a transmitting module 804, configured to transmit, on the first connecting device, the first data request to a first server of first type, the first server being configured to determine a first group of accounts as accounts about to participate in the scene interaction, and determine an address of a second server of second type, the second server being configured to create an interaction scene for realizing the scene interaction, the first group of accounts including accounts from a first group of different geographic regions, the first group of accounts including the first account, each account in the first group being used for transmitting a corresponding data request to the first server by using a corresponding connecting device, the corresponding data request being a request to start the scene interaction, and the corresponding connecting devices including connecting devices from a second group of different geographic regions;

an acquisition module 802, configured to acquire, on a target connecting device, the address of the second server transmitted by the first server after the interaction scene is created on the second server, network delays between the second server and the corresponding connecting devices being all less than a first delay threshold; and a transmitting module 804, configured to transmit, on the target connecting device, the address of the second server to the first account, and forward, to the second server, interaction data in the scene interaction transmitted by the first account.

Figure 9:
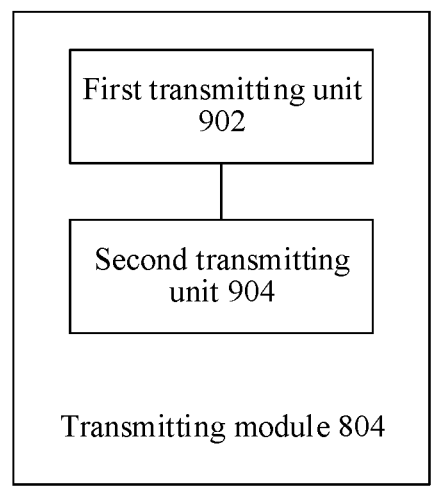
FIG. 9 is a schematic structural diagram of an account connecting apparatus according to another embodiment.

In one embodiment, FIG. 9 is a schematic structural diagram of an account connecting apparatus in another example application according to an embodiment of the present disclosure. As shown in FIG. 9, the transmitting module 804 includes: a first transmitting unit 902, configured to transmit, on a first CLB, a first data request to a first server by using a cloud connect network when the first connecting device is a first CLB. The first CLB is located in a first geographic region in a first group of different geographic regions, and a first server cluster where the first server is located is connected to a plurality of CLBs by using the cloud connect network. The plurality of CLBs include the first CLB, and the plurality of CLBs are respectively located in different geographic regions.

In one embodiment, the first transmitting unit 902 is configured to transmit, on the first CLB, the first data request to the first server by using a cloud connect network by performing the following operations: transmitting, on the first CLB, the first data request to a second CLB by using the cloud connect network, the second CLB being connected to a plurality of servers in a first server cluster; transmitting, on the second CLB, the first data request to a third server in the first server cluster, the third server being configured to provide a service other than a single scene interaction in a target application; and transmitting, on the third server, the first data request to the first server.

In one embodiment, the acquisition module is further configured to acquire, on the first connecting device, a first login request transmitted by the first account before acquiring the first data request transmitted by the first account on the first connecting device. The transmitting module is further configured to transmit, on the first connecting device, the first login request to a third type of third server in the first server cluster, the third server being configured to provide a service other than the single scene interaction in the target application. The acquisition module is further configured to acquire, on the first connecting device, target data transmitted by the third server. The target data includes data of the first account in the target application acquired by the third server from a target database. The transmitting module is further configured to transmit, on the first connecting device, a first login response to the first account, the first login response being used for indicating successful login to the first account, and the first login response including the target data.

In one embodiment, as shown in FIG. 9, the transmitting module 804 includes: a second transmitting unit 904, configured to transmit, on a first GAAP, the first data request to the first server by using a second CLB when the first connecting device is the first GAAP. The second CLB is connected to a plurality of servers in a first server cluster, the plurality of servers include the first server, the first server cluster is connected to a plurality of CLBs by using a cloud connect network, and the plurality of CLBs are respectively located in different geographic regions.

In one embodiment, the acquisition module is further configured to acquire, on the first GAAP, a second login request transmitted by the first account. The transmitting module is further configured to transmit, on the first GAAP, the second login request to the third server in the first server cluster. The third server is configured to provide a service other than a single scene interaction in the target application. The acquisition module is further configured to acquire, on the first GAAP, target data transmitted by the third server. The target data includes data of the first account in the target application acquired by the third server from the target database. The transmitting module is further configured to transmit, on the first GAAP, a second login response to the first account. The second login response is used for indicating successful login to the first account, and the second login response includes the target data.

In one embodiment, the acquisition module is further configured to: acquire a list of first group of network delays on the first server, the list of first group of network delays including a network delay during data transmission between a connecting device corresponding to each account in the first group and each of a plurality of second type servers; determine an address of a second type server having a lowest network delay as the address of the second server when the first group of accounts are the same account; acquire identifiers of second type servers having a lowest network delay with connecting devices corresponding to all of a plurality of accounts when the first group of accounts include the plurality of accounts, to obtain a plurality of second type server identifiers; determine, when a quantity of the second type server identifiers indicating the same second type server exceeds a first threshold, an address of the same indicated second type server as the address of the second server; and determine the address of the second type server in the plurality of second type servers having a highest network delay evaluation parameter as the address of the second server when the quantity of the second type server identifiers indicating the same second type server does not exceed the first threshold.

In one embodiment, the acquisition module is further configured to: acquire, on the first connecting device, a second data request transmitted by the first account, the second data request being a request to add target virtual objects to the scene interaction; transmit, on the first connecting device, the second data request to the first server, the first server being further configured to determine the address of the second server as an address of a fourth type of fourth server, and the fourth server being configured to create the target virtual objects; transmit, on the target connecting device, the address of the fourth server to the first account, and forward, to the fourth server, interaction data in the scene interaction transmitted by the first account; and create, by the fourth server, the target virtual objects under a preset condition according to the interaction data.

In an embodiment, the preset condition includes at least one of the following: a quantity of the target virtual objects in the scene interaction is less than a first quantity threshold; an account in the first group of accounts having a connection failure number exceeding a second quantity threshold exists in the scene interaction; and an account in the first group of accounts having an attribute being a target account exists in the scene interaction, the target account being an account that is required to interact with the target virtual objects.

In one embodiment, the apparatus is further configured to: acquire, on the first connecting device, a third data request transmitted by the first account, the third data request being a request to record a video of a scene interaction; transmit, on the first connecting device, the third data request to the first server, the first server being further configured to determine the address of the second server as an address of a fifth type of fifth server, and the fifth server being configured to create a video file of the scene interaction; transmit, on the target connecting device, the address of the fifth server to the first account, and forward, to the fifth server, interaction data in the scene interaction transmitted by the first account; and create, by the fifth server, the video file of the scene interaction according to the interaction data.

Figure 10:
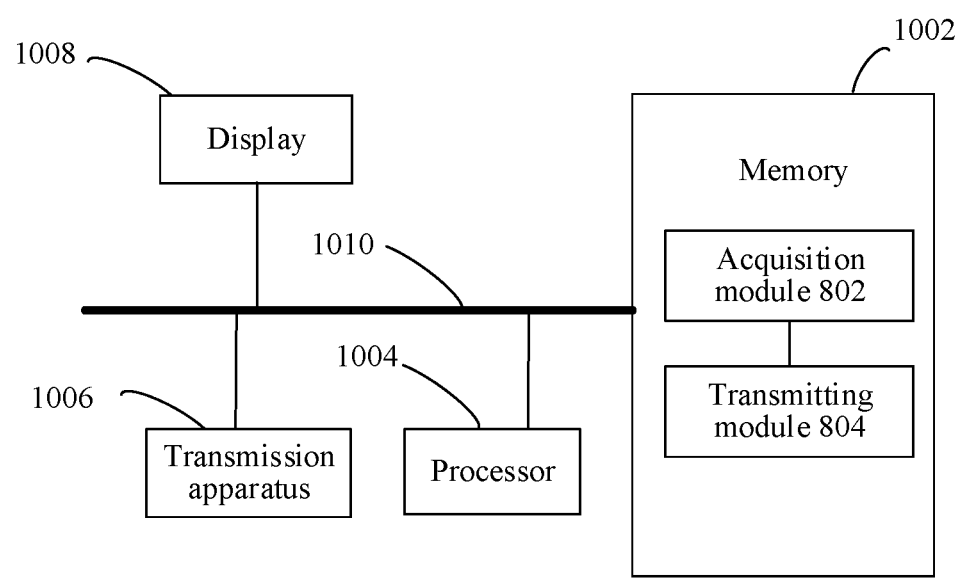
FIG. 10 is a schematic structural diagram of an electronic device according to an embodiment.

According to still another aspect of the embodiments of the present disclosure, an electronic device for implementing the account connecting method is further provided. The electronic device may be the terminal device or the server shown in FIG. 1. As shown in FIG. 10, the electronic device includes a memory 1002 and a processor 1004. The memory 1002 stores computer-readable instructions. The processor 1004 is configured to perform the steps in any one of the foregoing method embodiments by using the computer-readable instructions.

In an embodiment, the foregoing electronic device may be located in at least one of a plurality of network devices in a computer network.

In an embodiment, a person of ordinary skill in the art may understand that, the structure shown in FIG. 10 is only illustrative. The electronic device may be a terminal device such as a smartphone (for example, an Android phone, or an iOS phone), a tablet computer, a palmtop computer, a mobile Internet device (MID), or a PAD. FIG. 10 does not constitute a limitation on the structure of the electronic device. For example, the electronic device may further include more or fewer components (such as a network interface) than those shown in FIG. 10, or have a configuration different from that shown in FIG. 10.

The memory 1002 may be configured to store the computer-readable instructions and modules, such as the computer-readable instructions/modules corresponding to the account connecting method and apparatus in the embodiments of the present disclosure. The processor 1004 performs various function applications and data processing by running the computer-readable instructions and the modules stored in the memory 1002, so as to implement the account connecting method. The memory 1002 may include a high-speed random memory, and may also include a non-volatile memory such as one or more magnetic storage apparatuses, a flash memory, or another non-volatile solid-state memory. In some embodiments, the memory 1002 may further include memories remotely disposed relative to the processor 1004, and these remote memories may be connected to the terminal through a network. Examples of the network include, but are not limited to, the Internet, an intranet, a local area network, a mobile communications network, and a combination thereof. The memory 1002 may specifically be, but is not limited to, being configured to store information such as the related information of the first group of accounts and the target virtual operation objects. In an example, as shown in FIG. 10, the memory 1002 may include, but is not limited to, the acquisition module 802, the transmitting module 804, or the acquisition module 802 and the transmitting module 804 in the account connecting apparatus in the target application. In addition, the memory may further include, but is not limited to, other module units in the account connecting apparatus in the target application, and the details are not described again in this example.

In an embodiment, a transmission apparatus 1006 is configured to receive or transmit data through a network. A specific example of the foregoing network may include a wired network and a wireless network. In an example, the transmission apparatus 1006 includes an NIC. The NIC may be connected to another network device and a router by using a network cable, to communicate with the Internet or a local area network. In an example, the transmission apparatus 1006 is an RF module, which communicates with the Internet in a wireless manner.

In addition, the electronic device further includes: a display 1008, configured to display the target application; and a connection bus 1010, configured to connect various module components in the electronic device.

In other embodiments, the terminal or server may be a node in a distributed system. The distributed system may be a blockchain system. The blockchain system may be a distributed system formed by the plurality of nodes connected in the form of network communication. A peer to peer (P2P) network may be formed between the nodes. A computing device in any form, for example, an electronic device such as a server or a terminal, may become a node in the blockchain system by joining the P2P network.

According to still another aspect of the embodiments of the present disclosure, a computer-readable storage medium is further provided. The computer-readable storage medium stores computer-readable instructions, the computer-readable instructions, when being run, performing the steps in any one of the method embodiments.

In an embodiment, a person of ordinary skill in the art can understand that all or some of the steps of the methods in the foregoing embodiments can be implemented by computer-readable instructions instructing relevant hardware of a terminal device. The computer-readable instructions may be stored in a computer-readable storage medium, and the storage medium may include a flash drive, a ROM, a RAM, a magnetic disk, a compact disc, or the like.

The sequence numbers of the foregoing embodiments of the present disclosure are merely for description purpose, and are not intended to indicate the preference among the embodiments.

When the integrated unit in the foregoing embodiments is implemented in the form of a software function unit and sold or used as an independent product, the integrated unit may be stored in the foregoing computer-readable storage medium. Based on such an understanding, the technical solutions of the present disclosure essentially, or a part contributing to the related art, or all or a part of the technical solution may be implemented in a form of a software product. The computer software product is stored in a storage medium and includes several instructions for instructing one or more computer devices (which may be a PC, a server, a network device, or the like) to perform all or some of steps of the methods in the embodiments of the present disclosure.

In the foregoing embodiments of the present disclosure, the descriptions of the embodiments have respective focuses. For a part that is not described in detail in an embodiment, reference may be made to related descriptions in other embodiments.

In the several embodiments provided in the present disclosure, it is to be understood that the disclosed client may be implemented in another manner. The described apparatus embodiments are merely exemplary. For example, the unit division is merely logical function division, and may use other division manners during actual implementation. For example, a plurality of units or components may be combined or integrated into another system, or some features may be omitted or not performed. In addition, the coupling, or direct coupling, or communication connection between the displayed or discussed components may be the indirect coupling or communication connection by means of some interfaces, units, or modules, and may be in electrical or other forms.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The units described as separate parts may or may not be physically separate, and components displayed as units may or may not be physical units, that is, may be located in one position, or may be distributed on a plurality of network units. Some or all of the units may be selected according to an actual requirement to achieve the objectives of the solutions in the embodiments.

In addition, functional units in the embodiments of the present disclosure can be integrated into one processing unit, or each of the units can exist alone physically, or two or more units are integrated into one unit. The integrated unit may be implemented in a form of hardware, or may be implemented in a form of a software function unit.

The foregoing descriptions are exemplary implementations of the present disclosure. A person of ordinary skill in the art may make several improvements and refinements without departing from the principle of the present disclosure, and the improvements and refinements shall fall within the protection scope of the present disclosure.

What is claimed is:

1. An account connecting method, comprising:
   acquiring, by a first connecting device, a first data request transmitted by a first account, the first data request being a request to start a scene interaction in a target application;
   transmitting, by the first connecting device, the first data request to a first server, the first server being configured to determine a first group of accounts as accounts about to participate in the scene interaction, and determine an address of a second server, the second server being configured to create an interaction scene, the first group of accounts comprising accounts from a first group of different geographic regions, the first group of accounts comprising the first account, the accounts in the first group respectively transmitting a data request to the first server by using a corresponding connecting device, the data request a request to start the scene interaction, and at least two of the connecting devices corresponding to the accounts in the first group are from a second group of different geographic regions;
   acquiring, by a target connecting device, the address of the second server transmitted by the first server after the interaction scene is created on the second server, network delays between the second server and the corresponding connecting devices being all less than a first delay threshold, and the target connecting device being a connecting device having a lowest network delay with the first account; and
   transmitting, by the target connecting device, the address of the second server to the first account, and forwarding, to the second server, interaction data in the scene interaction transmitted by the first account.

2. The method according to claim 1, wherein the transmitting, by the first connecting device, the first data request to a first server comprises:
   transmitting, by a first cloud load balancer (CLB), the first data request to the first server by using a cloud connect network when the first connecting device is the first CLB, the first CLB being located in a first geographic region in the first group of different geographic regions.

3. The method according to claim 2, wherein the transmitting, by a first CLB, the first data request to the first server by using a cloud connect network comprises:
   transmitting, by the first CLB, the first data request to a second CLB by using the cloud connect network, the second CLB being connected to a plurality of servers in a first server cluster where the first server is located;
   transmitting, by the second CLB, the first data request to a third type of third server in the first server cluster, the third server being configured to provide a service other than a single scene interaction in the target application; and
   transmitting, by the third server, the first data request to the first server.

4. The method according to claim 1, wherein before the acquiring, by a first connecting device, a first data request transmitted by a first account, the method further comprises:
   acquiring, by the first connecting device, a first login request transmitted by the first account;
   transmitting, by the first connecting device, the first login request to a third server in the first server cluster;
   acquiring, by the first connecting device, target data transmitted by the third server, the target data comprising data of the first account in the target application acquired by the third server from a target database; and transmitting, by the first connecting device, a first login response to the first account, the first login response being used for indicating successful login to the first account, and the first login response comprising the target data.

5. The method according to claim 1, wherein the transmitting, by the first connecting device, the first data request to a first server comprises:

transmitting, by a first global application acceleration platform (GAAP), the first data request to the first server by using a second CLB when the first connecting device is the first GAAP, the second CLB being connected to a plurality of servers in a first server cluster, the plurality of servers comprising the first server, the first server cluster being connected to a plurality of CLBs by using a cloud connect network, and the plurality of CLBs being respectively located in different geographic regions.

6. The method according to claim 1, wherein after the transmitting, by the first connecting device, the first data request to a first server of first type, the method further comprises:

acquiring a list of first group of network delays by the first server, the list of first group of network delays comprising a network delay during data transmission between a connecting device corresponding to each account in the first group and each of a plurality of second type servers; and determining an address of a second type server having a lowest network delay as the address of the second server when the first group of accounts are the same account.

7. The method according to claim 6, further comprising:

acquiring identifiers of second type servers having a lowest network delay with the connecting devices corresponding to all of a plurality of accounts when the first group of accounts comprise the plurality of accounts, to obtain a plurality of second type server identifiers; and determining, when a quantity of the second type server identifiers indicating the same second type server exceeds a first threshold, an address of the same indicated second type server as the address of the second server.

8. The method according to claim 7, further comprising:

determining the address of the second type server in the plurality of second type servers having a highest network delay evaluation parameter as the address of the second server when the quantity of the second type server identifiers indicating the same second type server does not exceed the first threshold.

9. The method according to claim 1, further comprising:

acquiring, by the first connecting device, a second data request transmitted by the first account, the second data request being a request to add target virtual objects to the scene interaction;

transmitting, by the first connecting device, the second data request to the first server, the first server being further configured to determine the address of the second server as an address of a fourth type of fourth server, and the fourth server being configured to create the target virtual objects;

transmitting, by the target connecting device, the address of the fourth server to the first account, and forwarding, to the fourth server, the interaction data in the scene interaction transmitted by the first account; and creating, by the fourth server, the target virtual objects under a preset condition according to the interaction data.

10. The method according to claim 9, wherein the preset condition comprises at least one of the following:

a quantity of the target virtual objects in the scene interaction is less than a first quantity threshold;

an account in the first group of accounts having a connection failure number exceeding a second quantity threshold exists in the scene interaction; and an account in the first group of accounts having an attribute being a target account exists in the scene interaction, the target account being an account that is required to interact with the target virtual objects.

11. The method according to claim 1, further comprising:

acquiring, by the first connecting device, a third data request transmitted by the first account, the third data request being a request to record a video of the scene interaction;

transmitting, by the first connecting device, the third data request to the first server, the first server being further configured to determine the address of the second server as an address of a fifth type of fifth server, and the fifth server being configured to create a video file of the scene interaction;

transmitting, by the target connecting device, the address of the fifth server to the first account, and forwarding, to the fifth server, the interaction data in the scene interaction transmitted by the first account; and creating, by the fifth server, the video file of the scene interaction according to the interaction data.

12. An account connecting system comprising:

a first connecting device configured to:

acquire a first data request transmitted by a first account, the first data request being a request to start a scene interaction in a target application; and transmit the first data request to a first server, the first server being configured to determine a first group of accounts as accounts about to participate in the scene interaction, and determine an address of a second server of second type, the second server being configured to create the scene interaction, the first group of accounts comprising accounts from a first group of different geographic regions, the first group of accounts comprising the first account, and at least two of the connecting devices corresponding to the first group of accounts are from a second group of different geographic regions; and a target connecting device configured to:

acquire the address of the second server transmitted by the first server after the scene interaction is created on the second server, network delays between the second server and the corresponding connecting devices being all less than a first delay threshold, and the target connecting device being a connecting device having a lowest network delay with the first account; and transmit the address of the second server to the first account, and forward, to the second server, interaction data in the scene interaction transmitted by the first account.

13. The system according to claim 12, wherein:

the first connecting device is a first cloud load balancer (CLB) configured to transmit the first data request to the first server by using a cloud connect network, the first CLB being located in a first geographic region in the first group of different geographic regions.

14. The system according to claim 13, wherein the first CLB is further configured to: transmit the first data request to a second CLB by using the cloud connect network, the second CLB being connected to a plurality of servers in a first server cluster where the first server is located; wherein the first data request is transmitted by the second CLB to a third server in the first server cluster, the third server being configured to provide a service other than a single scene interaction in the target application; and the first data request is transmitted by the third server to the first server.

15. The system according to claim 12, wherein the first connecting device is configured to:
   acquire a first login request transmitted by the first account before acquiring the first data request transmitted by the first account;
   transmit, on the first connecting device, the first login request to a third type of third server in the first server cluster;
   acquire target data transmitted by the third server, the target data comprising data of the first account in the target application acquired by the third server from a target database; and
   transmit a first login response to the first account, the first login response being used for indicating successful login to the first account, and the first login response comprising the target data.

16. The system according to claim 12, wherein the first connecting device is a first global application acceleration platform (GAAP) configured to transmit the first data request to the first server by using a second CLB, the second CLB being connected to a plurality of servers in a first server cluster, the plurality of servers comprising the first server, the first server cluster being connected to a plurality of CLBs by using a cloud connect network, and the plurality of CLBs being respectively located in different geographic regions.

17. An electronic device, comprising a memory and one or more processors, the memory storing computer-readable instructions, the one or more processors being configured to:
   acquire a first data request transmitted by a first account, the first data request being a request to start a scene interaction in a target application;
   transmit the first data request to a first server, the first server being configured to determine a first group of accounts as accounts about to participate in the scene interaction, and determine an address of a second server of second type, the second server being configured to create the scene interaction, the first group of accounts comprising accounts from a first group of different geographic regions, the first group of accounts comprising the first account, and at least two of the connecting devices corresponding to the first group of accounts are from a second group of different geographic regions;
   acquire the address of the second server transmitted by the first server after the scene interaction is created on the second server, network delays between the second server and the corresponding connecting devices being all less than a first delay threshold, and the device being a connecting device having a lowest network delay with the first account; and
   transmit the address of the second server to the first account, and forward, to the second server, interaction data in the scene interaction transmitted by the first account.

18. The device according to claim 17, wherein: the device is a first cloud load balancer (CLB) configured to transmit the first data request to the first server by using a cloud connect network, the first CLB being located in a first geographic region in the first group of different geographic regions.

19. The device according to claim 17, wherein the processor is configured to:
   acquire a first login request transmitted by the first account before acquiring the first data request transmitted by the first account;
   transmit, on the first connecting device, the first login request to a third type of third server in the first server cluster;
   acquire target data transmitted by the third server, the target data comprising data of the first account in the target application acquired by the third server from a target database; and
   transmit a first login response to the first account, the first login response being used for indicating successful login to the first account, and the first login response comprising the target data.

20. The device according to claim 17, wherein the device is a first global application acceleration platform (GAAP) configured to transmit the first data request to the first server by using a second CLB, the second CLB being connected to a plurality of servers in a first server cluster, the plurality of servers comprising the first server, the first server cluster being connected to a plurality of CLBs by using a cloud connect network, and the plurality of CLBs being respectively located in different geographic regions.

* * * * *